(12) United States Patent  
Nagayasu

(10) Patent No.: US 8,134,076 B2  
(45) Date of Patent: Mar. 13, 2012

(54) GROMMET

(75) Inventor: Daiki Nagayasu, Yokkaichi (JP)

(73) Assignee: Sumitomo Wiring Systems, Ltd (JP)

( * ) Notice: Subject to any disclaimer, the term of this patent is extended or adjusted under 35 U.S.C. 154(b) by 250 days.

(21) Appl. No.: 12/663,905

(22) PCT Filed: Oct. 11, 2007

(86) PCT No.: PCT/JP2007/069797  
§ 371 (c)(1),  
(2), (4) Date: Dec. 10, 2009

(87) PCT Pub. No.: WO2008/152750  
PCT Pub. Date: Dec. 18, 2008

(65) Prior Publication Data  
US 2010/0181097 A1    Jul. 22, 2010

(30) Foreign Application Priority Data  
Jun. 13, 2007 (JP) ................................. 2007-156568

(51) Int. Cl.  
*H01B 17/58* (2006.01)

(52) U.S. Cl. ............ 174/152 G; 174/153 G; 174/152 R; 16/2.1; 248/56

(58) Field of Classification Search .............. 174/152 G, 174/153 G, 152 R, 167; 16/2.1, 2.2; 248/56; 277/178  
See application file for complete search history.

(56) References Cited

U.S. PATENT DOCUMENTS

| | | | | |
|---|---|---|---|---|
| 5,526,549 A | * | 6/1996 | Mori et al. | 16/2.1 |
| 5,739,475 A | * | 4/1998 | Fujisawa et al. | 174/153 G |
| 5,981,877 A | * | 11/1999 | Sakata et al. | 174/153 G |
| 6,058,562 A | * | 5/2000 | Satou et al. | 16/2.1 |
| 6,339,196 B1 | * | 1/2002 | Uchida | 174/153 G |
| 2003/0062694 A1 | | 4/2003 | Uchida et al. | |

FOREIGN PATENT DOCUMENTS

| | | |
|---|---|---|
| JP | 2001-099359 | 4/2001 |
| JP | 2002-223516 | 8/2002 |
| JP | 2003-032855 | 1/2003 |

* cited by examiner

*Primary Examiner* — Dhirubhai R Patel  
(74) *Attorney, Agent, or Firm* — Gerald E. Hespos; Michael J. Porco

(57) ABSTRACT

A grommet includes a small tubular section, an enlarging tubular section continued from an end of the smaller tubular section, and an annular recess on an outer surface at a large diameter end of the enlarging tubular section. The small tubular section is inserted into a through-hole from one side of a vehicle body panel so that the annular recess engages the vehicle body panel. Stepped projections extend axially from the small tubular section to the annular recess. Each stepped projection has an angle rib that protrudes from a connecting end of the small tubular section to a position where the angle rib contacts a peripheral edge around the through-hole. Slopes of the angle ribs at upper positions contact a peripheral edge around the through-hole at a position where the slopes at the upper positions do not pass the annular recess.

3 Claims, 7 Drawing Sheets

GROMMET

BACKGROUND OF THE INVENTION

1. Field of the Invention

This invention relates to a grommet that is mounted on a wire harness to be arranged in a motor vehicle and is installed in a through-hole in a vehicle body panel, and more particularly relates to a so-called one-motion grommet in which an inserting side end of a grommet is inserted into the through-hole at one side of the through-hole and the inserted part of the grommet is drawn out from the through-hole at other side of the through-hole and the grommet itself is moved to a given direction to be installed in the through-hole.

2. Description of the Related Art

A wire harness to be arranged from an engine room in a motor vehicle to a passenger room is threaded via a through-hole in a dash panel (or cowl panel) that partitions the passenger room from the engine room. In order to prevent water or dusts from entering the passenger room via the through-hole, a grommet integrally made of rubber or elastomer is mounted on the wire harness and a vehicle body engagement annular recess provided in the grommet is engaged with a peripheral edge around the through-hole.

An example of such a grommet has been provided. In the grommet, a smaller diameter tubular section of the grommet at an inserting end side is inserted into a through-hole in a vehicle body panel from an engine room side, the inserted smaller diameter tubular section is drawn at a passenger room side so that a diameter enlargement tubular section continued to the smaller diameter tubular section is inserted into the through-hole. A vehicle body engagement annular recess provided on the diameter enlargement tubular section is engaged with a peripheral edge around the through-hole.

Since the grommet itself is moved to a given direction with respect to the through-hole by drawing the grommet at the other side after inserting the grommet into the through-hole at the one side, the grommet is called as an one-motion grommet. Such grommet is generally used, since an attaching work of the grommet to the through-hole is easy.

The one-motion grommet has been disclosed in, for example, JP2003-32855 A. As shown in FIG. 7, a grommet 1 includes a smaller diameter tubular section 2 and a diameter enlargement tubular section 3 continued to the smaller diameter tubular section 2. The diameter enlargement tubular section 3 is provided on a larger diameter end side with a vehicle body engagement annular recess 4. The vehicle body engagement annular recess 4 is provided on the larger diameter end side with a vertical wall 4b and is provided on a smaller diameter side with a slant wall 4c. The walls 4b and 4c are opposed to each other across a groove 4a. A wire harness W/H is threaded into a hallow space in the diameter enlargement tubular section 3 from the smaller diameter tubular section 2 and a tape T is wound around an end of the smaller diameter tubular section 2 to secure the wire harness W/H to the grommet 1.

As shown in FIG. 7, in order to attach the grommet 1 to the through-hole H in a dash panel P, the smaller diameter tubular section 2 of the grommet 1 is inserted into the through-hole H from an engine room side (X), the smaller diameter tubular section 2 is drawn from a passenger room side (Y), the slant wall 4c is deformed inward to pass the through-hole H, the slant wall 4c recovered after passing and the vertical wall 4b are brought into close contact with the opposite sides of the vehicle panel P, and the vehicle body engagement annular recess 4 of the grommet 1 is installed in the through-hole H in the vehicle body panel P.

SUMMARY OF THE INVENTION

Usually, an attaching work of the grommet to the through-hole is carried out by one working person. After the working person inserts the smaller diameter tubular section 2 of the grommet 1 into the through-hole H at the engine room side (X), the working person moves to the passenger room side (Y) and draws the smaller diameter tubular section 2 projected from the through-hole H at the passenger room side (Y).

Accordingly, while the grommet 1 is drawn at the passenger room side (Y) with the smaller diameter tubular section 2 being inserted into the through-hole H at the engine room side (X), the grommet 1 is supported by the wire harness W/H threaded in the grommet 1 so that the grommet 1 is held in the through-hole H. At this time, an outer surface of the diameter enlargement tubular section 3 of the grommet 1 is reduced conically toward the smaller diameter tubular section 2 and is not held tightly by the peripheral edge around the through-hole H. Consequently, the grommet 1 is likely to incline on account of its own weight, as shown in FIG. 8. In particular, the grommet will be likely to further incline in accordance with an arranging posture of the wire harness W/H attached to the grommet 1. A central axial line of the grommet 1 does not accord with a central axial line of the through-hole H and inclines with respect to a horizontal direction.

If the central axial line of the grommet 1 accords with the central axial line of the through-hole, the whole periphery of the vehicle body engagement annular recess 4 of the grommet 1 can properly engage the whole peripheral edge around the through-hole H when the smaller diameter tubular section 2 is drawn at the passenger room side (Y).

However, as described above, since the grommet 1 inclines due to its own weight and the central axial line of the grommet 1 does not accord with the central axial line of the through-hole, during a period from a time when the grommet 1 is inserted into the through-hole at the engine room side (X) to a time when the grommet 1 is drawn at the passenger room side (Y), there are many cases where the grommet 1 will be drawn as the grommet 1 inclines.

The grommet 1, which inclines during a period from a time when the grommet 1 is inserted into the through-hole at the engine room side (X) to a time when the grommet 1 is drawn at the passenger room side (Y), is held on the inner peripheral edge around the through-hole H by a lower peripheral edge 1-X of the grommet 1. However, if an inclining angle of the grommet 1 is great, there is a case where the vehicle body engagement annular recess of an upper peripheral edge 1-Y passes the through-hole H. If the grommet 1 is drawn under this condition, the vehicle body engagement annular recess 4 of an upper peripheral edge 1-Y is not engaged with the through-hole H. Consequently, the working person must reattempt to insert the grommet 1 into the through-hole H. This will lower the workability extremely and will cause damage in the grommet 1.

Furthermore, when the grommet 1 is attached to the through-hole H, as shown in FIG. 9A, the grommet 1 may be inserted into the through-hole H from the engine room side (X) in an inclining direction S1 or S2 with respect to the central axial line S0 of the through-hole H. In addition, when the grommet 1 is drawn from the passenger room side (Y), the grommet 1 may be drawn in an inclining direction S3 or S4 with respect to the central axial line S0.

In particular, since an engine harness (or front harness) has many wires and a great weight, a grommet to be attached to the wire harness is required for a high strength. Consequently, a strong drawing force is required for drawing the grommet 1 and for engaging the vehicle body engagement annular recess with the peripheral edge around the through-hole H, and the grommet 1 is likely to be shifted from a straight direction.

If the grommet 1 is inserted slant into the through-hole at the engine room side (X) or if the grommet 1 is drawn slant at the passenger room side (Y), the vehicle body engagement annular recess 4 is engaged with a part of the peripheral edge around the through-hole H, and as shown in FIG. 9B, the vehicle body engagement annular recess 4 is not engaged with the entire peripheral edge around the through-hole. In result, a portion, which is not engaged with the through-hole, will remain in the grommet 1. Under this condition, waterproofing and dust-proofing functions will be lowered and there will be a possibility that the grommet 1 may fall down from the through-hole on account of vibrations in the motor vehicle.

The above troubles will occur in a position where the grommet is inserted into the through-hole in the vehicle body panel, as well as the position of the engine harness.

In order to solve the above problems, an object of the present invention is to provide a grommet that is inserted into a through-hole in a vehicle body panel at one side, is temporarily attached to the through-hole without inclining at a great angle, and to provide a grommet in which a vehicle body engagement annular recess is prevented from passing the through-hole when the grommet is drawn from the other side. In addition, another object of the present invention is to provide a grommet in which an inserting direction of the grommet into the through-hole and a drawing direction of the grommet can be corrected so that a center of the grommet accords with a center of the through-hole, thereby surely engaging the grommet with a whole periphery around the through-hole.

In order to solve the above problems, the present invention is directed to a grommet to be installed in a through-hole in a vehicle body panel with the grommet being mounted on a wire harness for a motor vehicle. The grommet is made of rubber or elastomer. The grommet includes a smaller diameter tubular section, a diameter enlargement tubular section continued to an end of the smaller diameter tubular section, and a vehicle body engagement annular recess on an outer surface of the diameter enlargement tubular section at a larger diameter side. The smaller diameter tubular section is inserted into the through-hole from one side of the vehicle body panel and is drawn from the other side of the vehicle body panel so that the vehicle body engagement annular recess is engaged with the vehicle body panel. The diameter enlargement tubular section is provided on an outer peripheral surface with a plurality of stepped projections that are spaced apart from one another in a peripheral direction and extend from the smaller diameter tubular section to the vehicle body engagement annular recess in an axial direction. Each of the stepped projections is provided on an outer surface with an angle rib that protrudes from a connecting side end of the smaller diameter tubular section to a contact position on which the angle rib contacts with a peripheral edge around the through-hole when inserting the grommet into the through-hole. The angle rib protrudes from the connecting side end in a direction perpendicular to an axial direction of the grommet. The angle rib is provided with a flat projection surface that protrudes in a direction perpendicular to the central axial line of the grommet, and with a slope that inclines from a crest projection end of the flat projection surface to an outer surface of the stepped projection. Each of the angle ribs is provided on a whole length of an outer surface of each stepped projection in a peripheral direction. A virtual outer diameter D1 of a line connecting the crest projection ends of the angle ribs is set to be 50% to 80% of an inner diameter d of the through-hole. The crest of each angle rib is disposed from an end of the smaller diameter tubular section within a range of ½ to ⅔ of a whole length from an end at a side of the smaller diameter tubular section to the contact position on which the smaller diameter tubular section contacts with the peripheral edge around the through-hole. The slopes of the angle ribs disposed at lower positions are held on an inner peripheral surface of the through-hole with the smaller diameter tubular section being inserted in the through-hole. The grommet is held at a temporary position until the smaller diameter tubular section is drawn from the other side, and the slopes of the angle ribs disposed at upper positions are brought into contact with a peripheral edge around the through-hole at a position where the slopes at the upper positions do not pass over the vehicle body engagement annular recess while holding the grommet at the temporary position. The flat projecting surfaces of the angle rib interfere with the through-hole so that the grommet is blocked from entering the through-hole. An inserting posture is corrected to a straight direction so that the flat projecting surfaces do not interfere with the through-hole.

As described above, the diameter enlargement tubular section is provided on the outer peripheral surface with the stepped projections spaced apart from one another in the peripheral direction and the angle rib protrudes from the connecting end to the smaller diameter tubular section of each stepped projection. After the working person inserts the smaller diameter tubular section into the through-hole in the vehicle body panel from one side (for example, an engine room side), the working person moves to the other side (for example, a passenger room side) and draws the smaller diameter tubular section. Even if the grommet inclines due to its own weight before the smaller diameter tubular section is drawn, the slopes of the angle ribs disposed at the lower side engage the lower inner peripheral surface of the through-hole, thereby holding the grommet on the temporary mounting position. That is, the angle ribs can be utilized as a temporary mounting rib.

Since the grommet is held so that the slopes disposed at the lower side of the angle ribs are mounted on the temporary position in the through-hole and the slopes disposed at the upper side of the angle ribs do not pass the through-hole, it is possible to prevent the upper side of the vehicle body engagement annular recess from disengaging the through-hole while drawing the smaller diameter tubular section inserted into the through-hole.

Furthermore, since each stepped projection is provided on the end side of the smaller diameter tubular section with the angle rib that is likely to interfere with the peripheral edge around the through-hole, if the smaller diameter tubular section of the grommet is inserted slant into the through-hole in the vehicle body and the crests of the angle ribs interfere with the peripheral edge around the through-hole, the interfering angle ribs cannot pass the through-hole when drawing the smaller diameter tubular section from the other side. The working person cannot draw the grommet further into the through-hole. Consequently, the working person can find that the grommet is being drawn in the slant position and then is forced to correct the posture of the grommet so that the angle ribs do not interfere with peripheral edge around the through-hole. Accordingly, it is possible to positively prevent the grommet from being inserted slant.

When the flat projecting surfaces of the angle ribs contact with the peripheral edge around the through-hole, the inclining angle of the grommet becomes great. Under this condition, the upper side of the grommet mounted temporarily on the through-hole is disposed on the position where the vehicle body engagement annular recess passes the through-hole. Consequently, there is a gap between the distal end of the larger diameter of the grommet and the peripheral edge around the through-hole.

Preferably, each of the angle ribs is provided on a whole length of an outer surface of each stepped projection in a peripheral direction. A virtual outer diameter D1 of a line connecting the crest at the projection ends of the flat projecting surfaces is set to be 50% to 80% of an inner diameter d of the through-hole. The crest of each angle rib is disposed from an end of the smaller diameter tubular section within a range of ½ to ⅔ of a whole length from an end at a side of the smaller diameter tubular section to the contact position on which the smaller diameter tubular section contacts with the peripheral edge around the through-hole. The virtual outer diameter D1 is set to be smaller than an inner diameter d of the through-hole in the vehicle body panel. Preferably, the virtual outer diameter D1 is set to be more than 60% of the inner diameter d of the through-hole.

As described above the virtual outer diameter D1 of a line connecting the crest projection ends of the angle ribs is set to be 50% to 80% of the inner diameter d of the through-hole. If the projecting amount of the angle rib is less than 50%, when the grommet is inserted into the through-hole even at a slant angle of 45 degrees, there is a possibility that the angle rib can pass the through-hole and the grommet is forced to be pushed into the through-hole as the grommet keeps the slant inserting posture. On the other hand, the projecting amount of the angle rib is over 80%, the diameter enlargement tubular section is hard to be deformed and the inserting force increases. This will become a burden for a working person.

Also, as described above, the crest of each angle rib is disposed from an end of the smaller diameter tubular section within a range of ½ to ⅔ of a whole length from an end at a side of the smaller diameter tubular section to the contact position on which the smaller diameter tubular section contacts with the peripheral edge around the through-hole.

The position of the crest of each angle rib is a position on which a projecting end of the slope of the angle rib protrudes from the side of the smaller diameter tubular section in a direction perpendicular to the axial direction. If the crest position approaches the contact point, the projecting amount of the angle rib will increase. If the angle rib is formed over ⅔, as described above, the diameter enlargement tubular section is hard to be deformed and the inserting force increases. This will become a burden for a working person. On the other hand, if the angle rib is formed less than ½, the projecting amount of the angle rib is too small to correct the slant inserting posture of the angle rib.

In the grommet of the present invention, the diameter enlargement tubular section is provided on the outer surface with a plurality of stepped projections spaced apart from one another in the peripheral direction and extending from the smaller diameter tubular section to the vehicle body engagement annular recess in the axial direction. The outer peripheral surfaces of the stepped projections contact with the inner peripheral surface of the through-hole to decrease a contact area. In result, this will decrease an inserting force of the grommet into the through-hole.

Preferably, a groove is provided between each of the angle ribs and an outer surface of the smaller diameter tubular section.

As describe above, the angle rib protrudes from the end of the smaller diameter tubular section side of each stepped projection. Since the groove is provided between the angle rib and the outer peripheral surface of the smaller diameter tubular section, the deflection of the smaller diameter tubular section is not restrained. In the case where the smaller diameter tubular section must be bent rapidly, it is possible to readily bend the smaller diameter tubular section without drawing the diameter enlargement tubular section.

Preferably, the vehicle body engagement annular recess includes a first higher wall at a side of a distal end thick portion and a second lower wall at a side of a smaller diameter tubular section. The first and second lower walls are disposed across a groove bottom of the recess. The second lower wall is formed into a shape adapted to be deflected inward so that the second lower wall can pass the through-hole. The diameter enlargement tubular section is provided on an outer peripheral surface with more than six stepped projections so that each of the projections protrudes from the connecting end of the smaller diameter tubular section. Each of the stepped projections extends to a projecting end of the second lower wall of the vehicle body engagement annular recess. Widths of the stepped projections in the peripheral direction are set to be equal to one another. Each of the stepped projections extends in the axial direction of the grommet. Each of the stepped projections is provided with the angle rib on the contact position where the stepped projections contact with the peripheral edge around the through-hole when inserting the grommet. A projecting amount of each stepped projection is substantially constant from a connecting end to the angle rib to the distal end of the second lower wall, and the second lower wall is provided near an end with a peripheral groove.

As described above, since the diameter enlargement tubular section is provided on the outer peripheral surface with the stepped projections each having the above configuration, immediately after all of the angle ribs of the grommet pass the through-hole while the grommet is moving in the through-hole, the outer surfaces of the stepped projections contact with the peripheral surface of the through-hole. Consequently, it is necessary to push the grommet into the through-hole from the contact point while deflecting the second lower wall inward. Accordingly, it is possible for the working person to effectively carry out the inserting work of the grommet into the through-hole in one stroke. Since each of the stepped projections is provided on the distal end with the peripheral groove near the second lower wall of the vehicle body engagement annular recess, it is possible to deform the second lower wall toward the groove side of the vehicle body engagement annular recess. Since the projecting amount of each stepped projection is set to be small, it is possible to decrease the inserting force.

Since more than six (preferably, eight) stepped projections having the angle ribs are provided, the widths of the stepped projections in the peripheral direction are equal to one another, and the stepped projections extend in the axial direction, end portions of the adjacent stepped projections approach to one another at the smaller diameter tubular section side and are widened radially toward the distal end of the second lower wall, and a triangular shaped recess is defined on the outer peripheral surface of the diameter enlargement tubular section between the adjacent stepped projections.

As described above, since an area of the thin recess increases toward the vehicle body engagement annular recess, the grommet is likely to be deflected in a diameter decreasing direction, thereby decreasing the inserting force.

Furthermore, as described above, since the grommet is provided with many (six to eight) stepped projections and each stepped projection is provided with the angle rib, the number of the angle ribs that are held on the inner peripheral surface around the through-hole will increase, thereby steady holding the grommet on the temporary mounting position.

According to the present invention, after the smaller diameter tubular section of the grommet is inserted into the through-hole in the vehicle body panel from the one side and before the smaller diameter tubular section is drawn from the other side, the grommet that is likely to incline on account of its own weigh can be held on the temporary mounting position by contacting the slopes of the angle ribs disposed at the lower side with the lower side of the inner peripheral surface of the through-hole. Since under the temporary mounting condition the angle ribs disposed at the upper side of the stepped projections contact with the upper side of the inner peripheral surface of the through-hole at the position where the angle ribs do not pass the vehicle body engagement annular recess, it is possible to surely prevent the grommet from passing the through-hole without disengaging a part of the vehicle body engagement annular section from the through-hole when the grommet is drawn to be engaged with the vehicle body engagement annular recess.

Furthermore, when the flat projecting surfaces of the angle ribs contact with the peripheral edge around the through-hole under the temporary mounting condition, the grommet cannot pass the through-hole upon drawing. Accordingly, the working person is forced to correct the inserting posture of the grommet in a strait position so that the angle ribs do not interfere with the peripheral edge around the through-hole. Consequently, it is possible to properly engage the whole periphery of the vehicle body engagement annular recess with the whole peripheral edge around the through-hole. Thus, it is possible to prevent the grommet from passing the through-hole as the grommet keeps the slant posture.

DETAILED DESCRIPTION OF THE PREFERRED EMBODIMENTS

Referring now to FIG. 1 to FIG. 6B, an embodiment of a grommet in accordance with the present invention will be described below.

Figure 7:
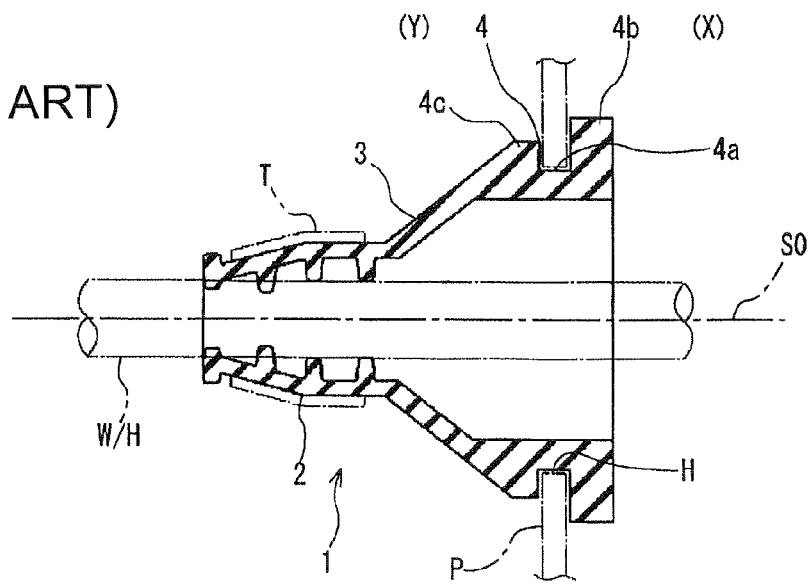
FIG. 7 is a longitudinal section view of a conventional grommet.
Figure 8:
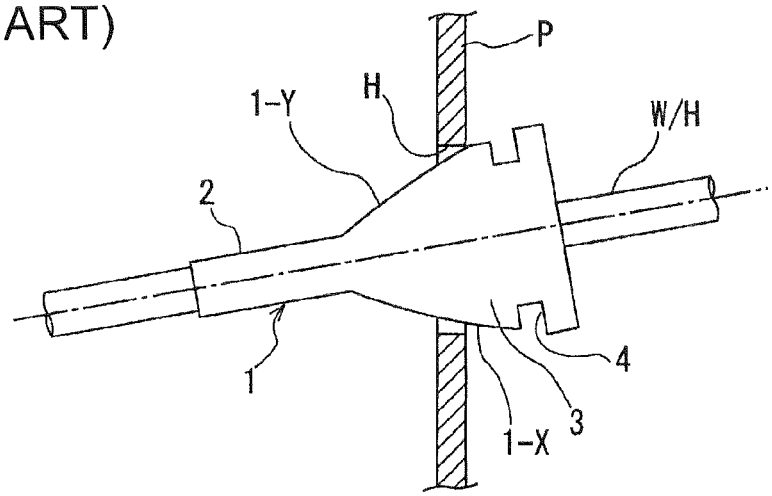
FIG. 8 is a side elevation view of the conventional grommet, illustrating a problem in the conventional grommet.
Figure 9A:
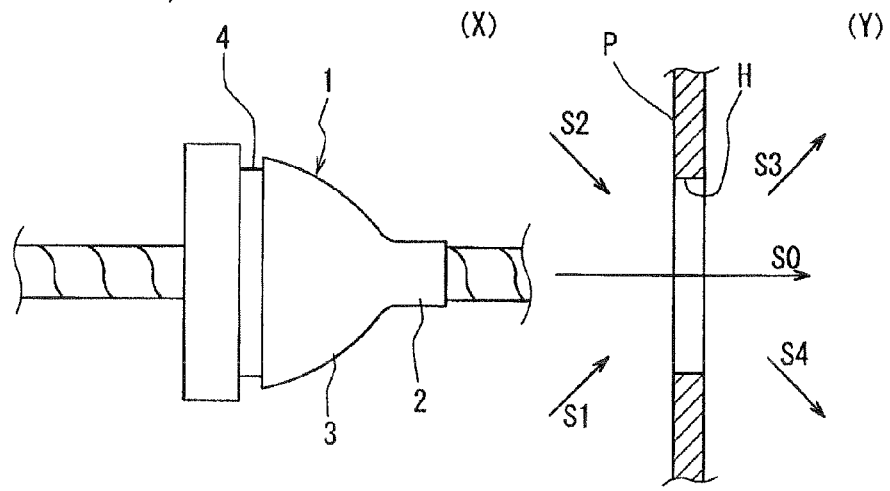
FIG. 9A is a side elevation view of the conventional grommet, illustrating a case where the grommet is inserted into a through-hole in a vehicle body panel in slant postures.
Figure 9B:
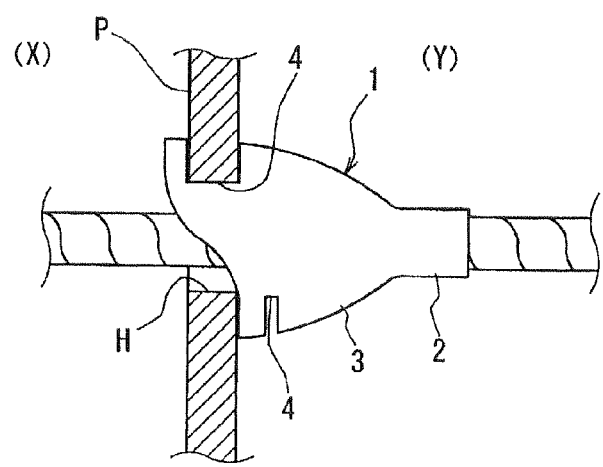
FIG. 9B is a side elevation view of the conventional grommet, illustrating the grommet improperly inserted in the through-hole.

In an embodiment of the present invention, a grommet 10 is previously attached to a wire harness W/H that is arranged from an engine room side (X) via a through-hole H in a vehicle body panel P into a passenger room side (Y), as is the case with the conventional wire harness W/H shown in FIG. 7 and the like. In order to install the grommet 10 in the through-hole H, a smaller diameter tubular section 11 of the grommet 10 is inserted into the through-hole H from the engine room side (X), the smaller diameter section 11 is drawn from the passenger room side (Y) to move the grommet toward the passenger room (Y), and a vehicle body engagement annular recess 14 provided on an diameter enlargement tubular section 13 of the grommet 10 is fitted on an inner peripheral surface Ha around the through-hole H.

The grommet 10 is integrally formed from a rubber material. The grommet 10 includes the smaller diameter tubular section 11 that is a front side in an inserting direction and the diameter enlargement tubular section 13 continued to a rear side of the smaller diameter tubular section 11. The diameter enlargement tubular section 13 is enlarged conically from an end continued to the rear side of the smaller diameter tubular section 11. The diameter enlargement tubular section 13 is provided on a distal end with a distal end thick portion 12 that extends in a direction perpendicular to an axial direction of the grommet 10. The vehicle body engagement annular recess 14 is provided on an outer peripheral surface of the grommet 10 between the distal end thick portion 12 and the diameter enlargement tubular section 13.

The vehicle body engagement annular recess 14 includes a first higher wall 14a at the side of the distal end thick portion 12 and a second lower wall 14c opposed to the first higher wall 14a beyond a groove 14b. A height of the first higher wall 14a is greater than that of the second lower wall 14c with respect to a bottom surface of the groove 14b. A pressing clip 14e is disposed on a bottom surface of the groove 14b.

A plurality of stepped projections 20 are provided on an outer peripheral surface of the diameter enlargement tubular section 13 and are spaced apart from one another in a peripheral direction. Each stepped projection 20 extends from the continued portion between the smaller diameter tubular section 11 and the diameter enlargement tubular section 13 to a distal end of the second lower wall 14c of the vehicle body engagement annular recess 14.

Figure 1:
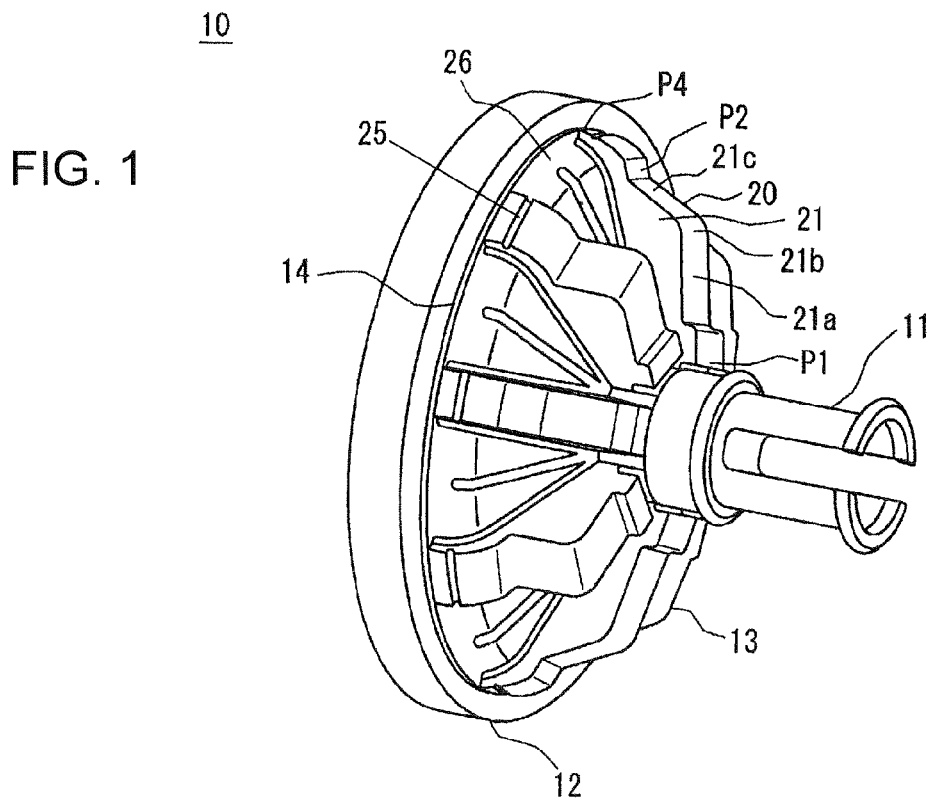
FIG. 1 is a perspective view of an embodiment of a grommet in accordance with the present invention.
Figure 2:
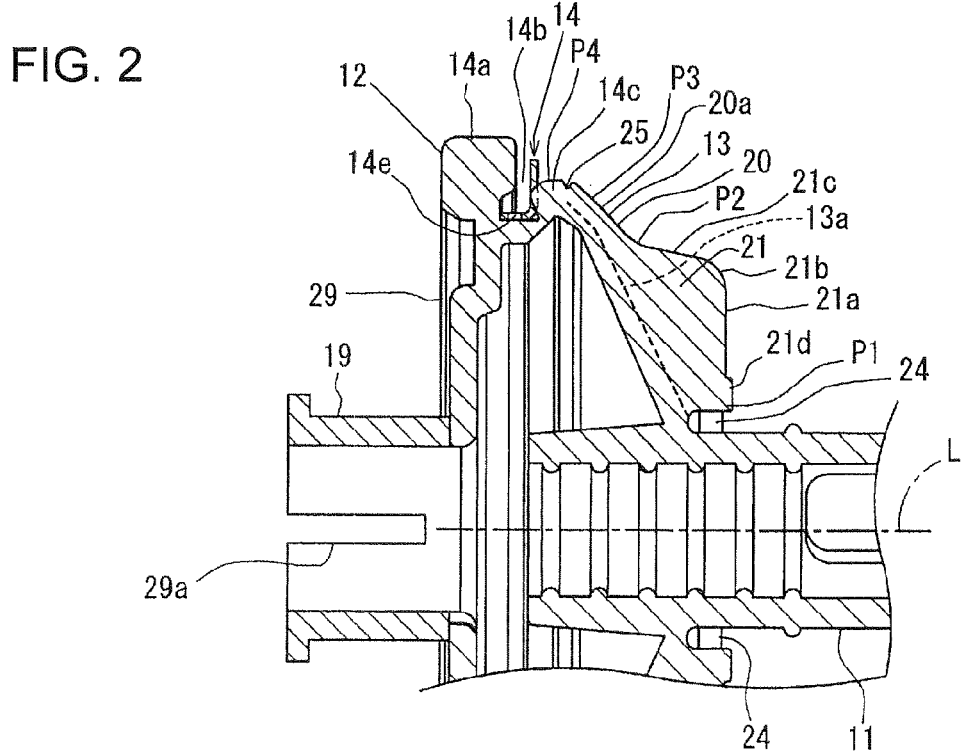
FIG. 2 is a longitudinal section view of the grommet taken along an axial direction in FIG. 1.
Figure 3:
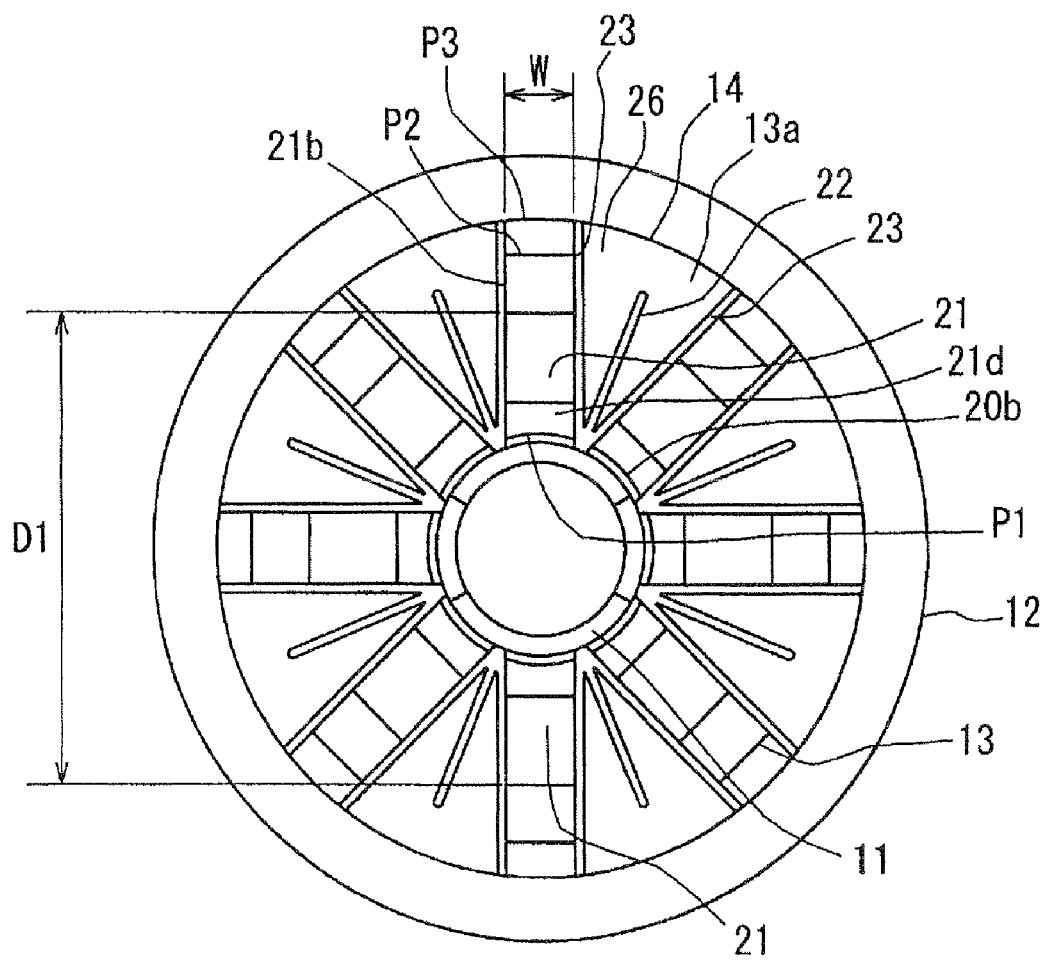
FIG. 3 is a rear side view of the grommet taken from a smaller diameter tubular section in FIG. 1.

In the present embodiment, as shown in FIGS. 2 and 3, eight stepped projections 20 are provided on the diameter enlargement tubular section 13 and have the same configurations. The stepped projections 20 have the same widths W in the peripheral direction. Each stepped projection 20 extends from a proximal end P1 on the smaller diameter tubular section 11 to a distal end P4 of the second lower wall 14c of the vehicle body engagement annular recess 14 in the axial direction. The stepped projections 20 are arranged radially on the outer peripheral surface of the diameter enlargement tubular section 13.

Each stepped projection 20 is provided on an outer surface 20a with an angle rib 21 that extends from the proximal end P1 of the smaller diameter tubular section 11 to a contact position P3 that contacts with the inner peripheral surface Ha around the through-hole H in the vehicle body panel P when the grommet 10 is inserted into the through-hole H. The angle rib 21 includes a flat projection surface 21a extending from the proximal end P1 in a direction Z perpendicular to a central axial line L of the grommet 10, and a slope 21c inclining from a crest 21b of a distal end of the flat projection surface 21a toward the outer surface 20a of the stepped projection 20. The outer surface 20a is continued to the slope 21c at a position P2 beyond the position P3. The slope 21c serves as a temporary attaching surface when the grommet 10 is inserted into the through-hole from one side and is drawn into the other side.

As described above, the flat projection surface 21a of the angle rib 21 at the side of the smaller diameter tubular section 11 extends in the direction Z perpendicular to the central axial line L when the flat projection surface 21a is taken from the smaller diameter tubular section 11. However, if a slant wall 13a of the diameter enlargement tubular section 13 is assumed to be a base of a substantially isosceles triangle, the flat projection surface 21a and slope 21c define hypotenuses of the substantially isosceles triangle.

A virtual outer diameter D1 (FIG. 3), which is defined by interconnecting the crests 21b of the angle rib 21 that defines the isosceles triangle, is set to be smaller than an inner diameter d (FIG. 4A) of the through-hole H in the vehicle body panel P.

Each angle rib 21 is provided on a whole length of the outer surface 20a of each stepped projection 20 in the peripheral direction. The virtual outer diameter D1 that interconnects the crests 21b is set to be 50% to 80% of the inner diameter d of the through-hole H (77% in the present invention). The crest 21b is disposed on a position within a range of ½ to ⅔ of a whole length from the proximal end P1 to the contact point P3 on which the diameter enlargement tubular section 13 contacts with the through-hole H, with respect to the proximal end P1 of the side of the smaller diameter tubular section 11. The position P2 is set to be a ½ point of the whole length in the present embodiment.

The flat projection surface 21a of each angle rib 21 is provided on a proximal end opposite from the crest 21b with a stepped bump portion 21d that is raised slightly from the flat projection surface 21a. A groove 24 is defined between the stepped bump portion 21d and the outer surface of the smaller diameter tubular section 11.

As shown in FIG. 2, a projecting height of the stepped projection 20 protruding from the outer surface 13a of the diameter enlargement tubular section 13 is substantially constant along a length from the position P2 continued to the angle rib 21 to the position P4 that reaches the second lower wall 14c of the vehicle body engagement annular groove 14. A peripheral groove 25 is provided adjacent to the second lower wall 14c so that the distal end of the second lower wall 14c can be easily deflected into the vehicle body engagement annular recess 14.

Widths W (FIG. 3) of the respective stepped projections 20 are constant in the axial direction L. The stepped projections 20 extend radially from the smaller diameter tubular section 11 to the vehicle body engagement annular recess 14. As shown in FIG. 3, end portions 20b of the stepped projections 20 that protrudes the angle ribs 21 from the smaller diameter tubular section 11 are closely arranged so that the adjacent stepped projections 20 contact with one another. The stepped projections 20 are spaced apart from one another at the side of the vehicle body engagement annular recess 14. A triangular recess 26 including the outer surface 13a of the diameter enlargement tubular section 13 is defined and widened from the smaller diameter side to the larger diameter side.

As shown in FIG. 3, each triangular recess 26 is provided on a central part in the peripheral direction with a central groove 22. The stepped projection 20 is provided along the proximal portion with opposite grooves 23. These grooves 22 and 23 define the stepped projections 20 and enhance a stiffness of the diameter enlargement tubular section 13. However, the grommet 10 can be easily deformed in a diameter reducing direction when inserting the grommet 10 into the through-hole H. That is, the grooves 22 and 23 permit the recess 26 to be guided in a deforming direction and compressed effortlessly in a radial direction.

The diameter enlargement tubular section 13 is provided on a distal end of a larger diameter side with a thin end surface portion 29. A split smaller diameter tubular section 19 divided by a slit 29a protrudes from a central part of the thin end surface portion 29.

Next, a method will be described below in which the grommet 10 is attached to the wire harness W/H and is installed in the through-hole H in the vehicle body panel P (including a dash panel) that partitions the passenger room side (Y) from the engine room side (X).

Figure 4A:
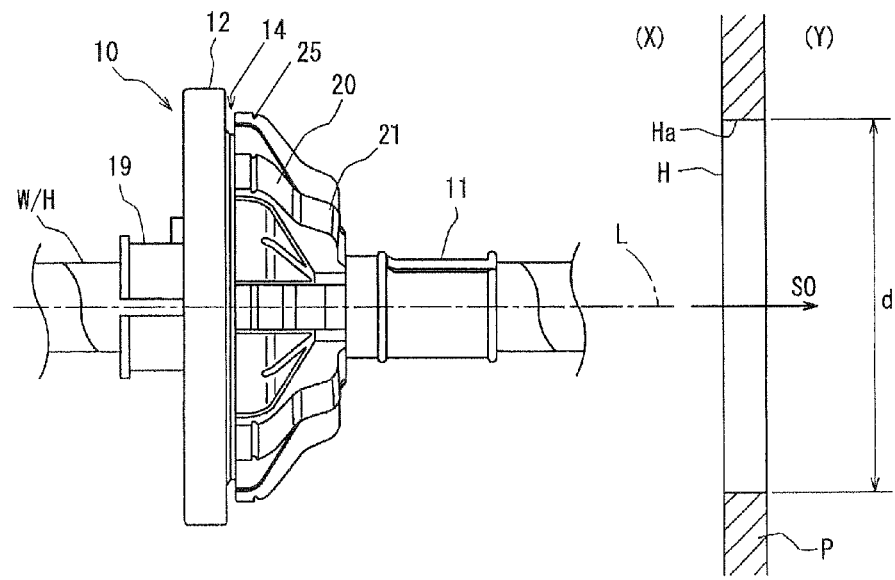
FIG. 4A is a side elevation view of the grommet shown in FIG. 1, illustrating the grommet that is being inserted into a through-hole in a vehicle body panel in a straight inserting posture.

The smaller diameter tubular section 11 of the grommet 10 is inserted into the through-hole H from the engine room side (X). At this time, as shown in FIG. 4A, if the central axial line L of the grommet 10 accords with the central axial line S0 of the through-hole H and the grommet 10 keeps a straight inserting position, all angle ribs 21 can pass the through-hole H without interfering with the peripheral edge around the through-hole H, as shown in FIG. 4B.

As described above, after a working person inserts the smaller diameter tubular section 11 and angle ribs 21 into the through-hole H at the engine room side (X), the working person moves to the passenger room side (Y), holds the smaller diameter tubular section 11 that passes the through-hole H and projects toward the passenger room (Y), and draws the grommet 10 into the passenger room side (Y).

During a period from a time when the smaller diameter tubular section 11 is inserted into the through-hole H at the engine room side (X) to a time when the working person moves to the passenger room side (Y), the grommet 10 is not inserted into the through-hole H into the contact position P3 of each stepped projection 20 that contacts with the inner diameter of the through-hole H. Consequently, the grommet 10 is not held tightly in the through-hole H but it is held by the wire harness W/H drawn out from the opposite ends of the grommet 10. Thus, the grommet 10 is left under a halfway via the through-hole H.

Figure 4B:
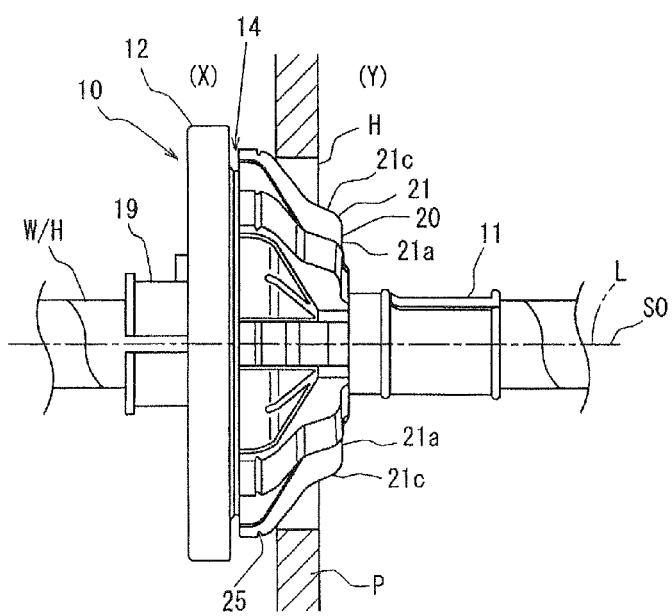
FIG. 4B is a side elevation view of the grommet similar to FIG. 4A, illustrating a part of the grommet that is properly inserted in the through-hole.
Figure 5A:
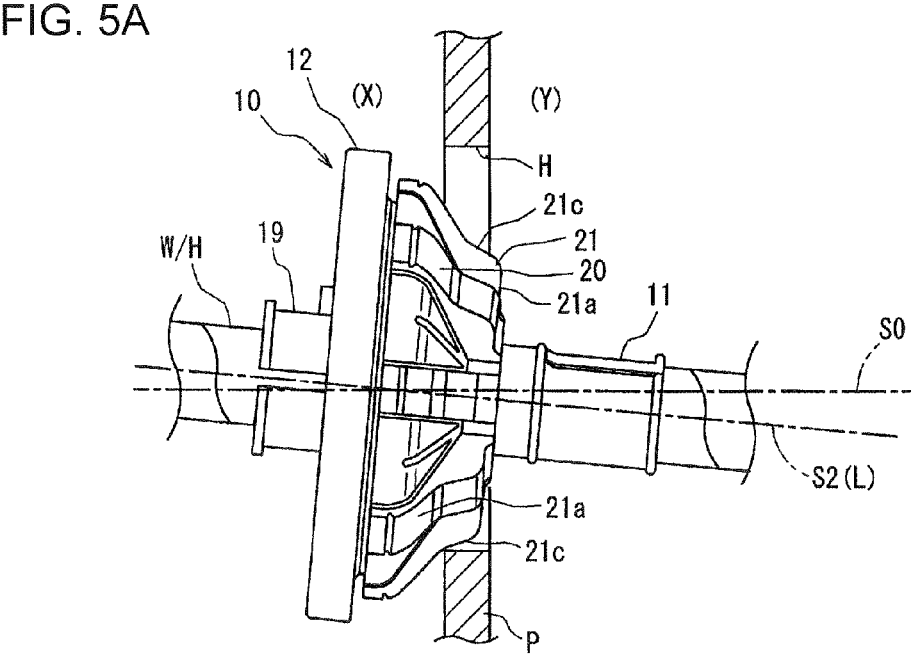
FIG. 5A is a side elevation view of the grommet similar to FIG. 4B, illustrating the grommet in a temporary mounting state from an inserting step to a drawing step.
Figure 5B:
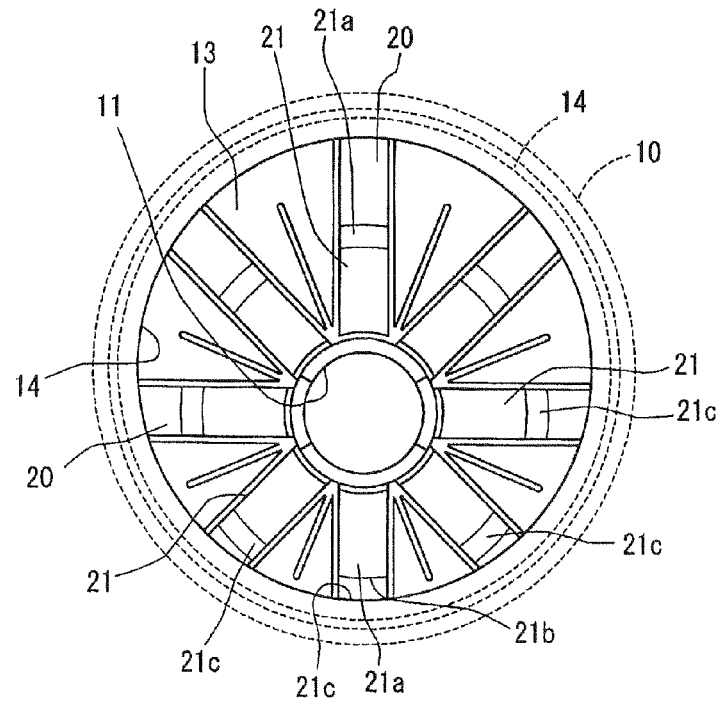
FIG. 5B is a rear side view of the grommet shown in FIG. 5A.

During the period, as shown in FIG. 4B, even if the central axial line L of the grommet 10 accords with the central axial line S0 of the through-hole H and the grommet 10 keeps the straight inserting position, the outer peripheral surface of the grommet 10 is not held tightly by the inner peripheral surface around the through-hole H. Consequently, as shown in FIGS. 5A and 5B, there will be a possibility that the grommet 10 will incline on account of its own weight.

In this case, the slopes 21c of the angle ribs 21 at the lower side of the peripheral edge is mounted on the inner peripheral surface Ha of the through-hole H, the grommet 10 is temporarily held in the through-hole H. Accordingly, it is possible to prevent the grommet 10 from further inclining at a greater angle. When the grommet 10 is held temporarily in the through-hole H, it is possible to keep the upper surfaces of the stepped projections 20, which does not pass the vehicle body engagement annular recess 14 at the smaller diameter side, contacting with the inner peripheral surface Ha of the through-hole H. That is, it is possible to prevent the upper side of the vehicle body engagement annular recess 14 from passing the through-hole H and entering into the passenger room side (Y).

Figure 6A:
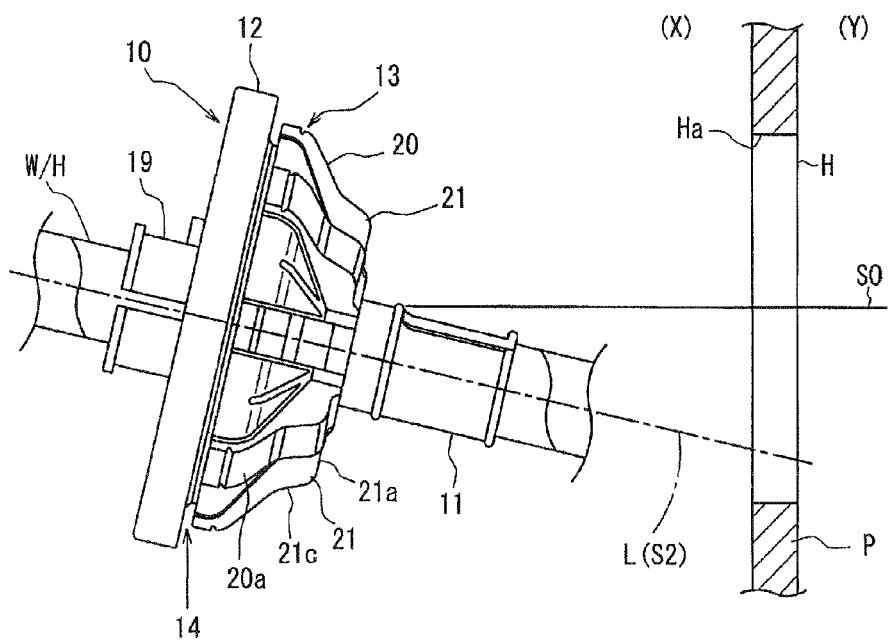
FIG. 6A is a side elevation view of the grommet similar to FIG. 4A, illustrating the grommet that is being inserted into a through-hole in a vehicle body panel in a slant posture.
Figure 6B:
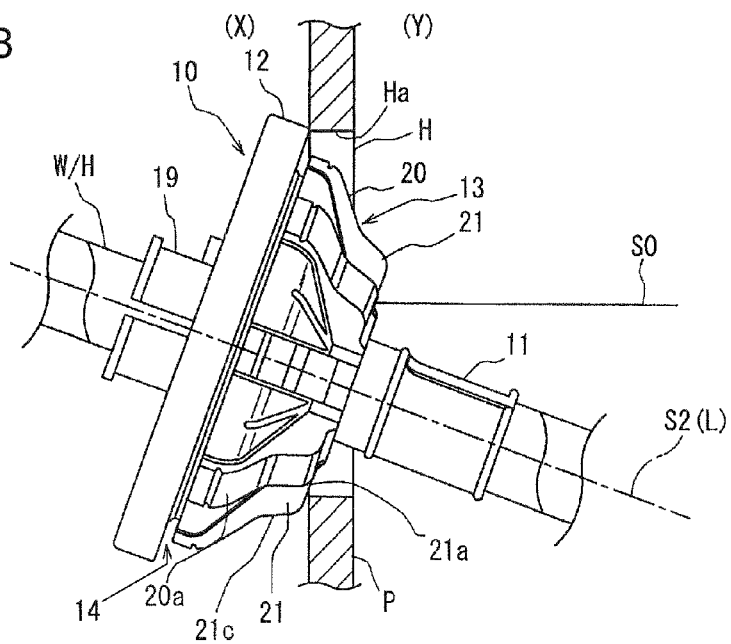
FIG. 6B is a side elevation view of the grommet similar to FIG. 6A, illustrating the grommet that is improperly inserted in the through-hole.

On the other hand, as shown in FIG. 6A, in the case where the central axial line L of the grommet 10 is much shifted from the central axial line S0 of the through-hole H and is inclined onto a slant line S2, the flat projecting surfaces 21a of some angle ribs 21 interferes with the peripheral edge around the through-hole H and cannot pass the through-hole H, as shown in FIG. 6B. Consequently, the grommet 10 cannot be inserted into the through-hole H. Accordingly, the grommet 10 under an inclined position is forced to change its inserting position to a straight direction so that the flat projecting surfaces 21a of the angle ribs 21 do not interfere with the peripheral edge around the through-hole H. In result, it is possible to prevent the grommet 10 from entering the through-hole in the slant posture.

As described above, after the working person inserts the smaller diameter tubular section 11 into the through-hole H at the engine room side (X), the working person moves to the passenger room side (Y), holds the smaller diameter tubular section 11 that projects toward the passenger room (Y), and draws the grommet 10 into the passenger room (Y). Under this working steps, as shown in FIGS. 5A and 5B, while the slopes 21c of the lower side angle ribs 21 are temporarily mounted on the inner peripheral surface Ha of the through-hole H, the grommet 10 is drawn.

Although the slopes 21c of the lower side angle ribs 21 are mounted on the lower side inner peripheral surface Ha of the through-hole H during the drawing step, since the slopes 21c incline on and continues to the surfaces of the stepped projections 20 at the side of the vehicle body engagement annular recess 14, the inner peripheral surface Ha of the through-hole H falls down onto the slopes 21c in response to the drawing step and the inner peripheral surface Ha can smoothly contact with the outer surfaces of the stepped projections 20.

Since the angle ribs 21 are arranged coaxially about the central axial line L of the grommet 10 and the working person can take care so that a center of each angle rib 21 accords with the center of the through-hole H during the drawing step while the working person is watching the grommet 10 at the passenger room side (Y), the working person can draw the grommet 10 while the central axial line L of the grommet 10 is according with the central axial line S0 of the through-hole H.

When the working person draws the grommet 10 at the passenger room side (Y), the diameter enlargement tubular section 13 passes the through-hole H. Then, when the contact points P3 on the stepped projections 20 contact with the inner peripheral surface of the through-hole H, the working person pushes the grommet 10 into the through-hole H in one stroke so that the stepped projections 20 are compressed. At this time, since the grooves 22 and 23 are provided in the recess 26 among the stepped projections 20, the recess 26 is smoothly compressed and the second lower wall 14a can be readily bent into the vehicle body engagement annular recess 14 on account of the peripheral groove 25 at the distal end side. Consequently, it is possible to push the grommet 10 into the through-hole H by a small inserting force without requiring a great pushing force.

Thus, the outer surfaces 20a of the eight stepped projections 20 are pressed by the inner peripheral surface Ha of the through-hole H and the projected end of the second lower wall 14c passes the through-hole H while the diameter enlargement tubular section 13 is being compressed.

After the second lower wall 14c passes the through-hole H, the diameter enlargement tubular section 13 recovers it original position due to its own elasticity and the peripheral edge around the through-hole H falls down into the groove 14b between the first higher wall 14a and the second lower wall 14c. Under this condition, the opposed surfaces of the first and second walls 14a and 14c press the opposite surfaces of the vehicle body panel P and the clip 14e disposed in the groove 14b in the through-hole H, thereby holding the grommet 10 in the through-hole H in a sealed state.

As described above, since the diameter enlargement tubular section 13 of the grommet 10 is provided on the outer surface with the stepped projections 20 and the stepped projections 20 are provided on the side of the smaller diameter tubular section 11 with the angle ribs 21, only one working person can insert the smaller diameter tubular section 11 of the grommet 10 into the through-hole H at the one side of the through-hole H and the working person moves to the other side of the through-hole H after the inserting step. In the case of drawing the smaller diameter tubular section 11, during a period from a time of finishing the inserting step to a time of beginning the drawing step, the slopes 21c of the angle ribs 21 of the grommet 10 can be temporarily mounted on the inner surface Ha of the through-hole H and it is possible to steady the grommet 10 on the temporary position without inclining the grommet 10 at a greater angle on a halfway via the through-hole H. Under the temporary mounting condition, since the outer peripheral surface of the diameter enlargement tubular section 13 does not permit the vehicle body engagement annular recess 14 to pass the through-hole H at an upper side opposite from the lower side that is the temporary mounting position and contacts with the inner surface Ha of the through-hole H, it is possible to surely prevent a part of the vehicle body engagement annular recess 14 from being moved into the passenger room side (Y) without mounting the recess 14 on the inner surface Ha of the through-hole H upon the drawing step at the other side. Accordingly, it is possible to positively engage the whole vehicle body engagement annular recess 14 with the entire peripheral edge around the through-hole H.

Since the flat projecting surfaces 21a of the angle ribs 21 will interfere with the peripheral edge around the through-hole H and will not be inserted into the through-hole H if the grommet 10 is inserted into the through-hole H at a great inclining angle, the working person must correct the inserting position of the grommet so as to insert the grommet 10 into the through-hole H, thereby preventing the grommet 10 from being slant inserted into the through-hole.

Furthermore, since the grooves 22 and 23 are provided in the outer surface of the diameter enlargement tubular section 13 so that the recesses 26 between the stepped projections 20 can be deflected, the diameter enlargement tubular section 13 can be compressed uniformly in the peripheral direction. Since the groove 25 permits the second lower wall 14c to be readily bent into the vehicle body engagement annular recess 14, it is possible to engage the grommet 10 with the through-hole H in the vehicle body panel P by a small inserting force.

Also, since the angle rib 21 is separated from the smaller diameter tubular section 11 by the groove 24, it is possible to easily bend the smaller diameter tubular section 11 in the case where the grommet 10 must be bent in accordance with an arrangement of the wire harness W/H and it is also possible to interrupt a drawing force from the wire harness W/H so that the drawing force is not transmitted to the angle ribs 21 and stepped projections 20, thereby preventing the vehicle body engagement annular recess 14 of the grommet 10 from coming out from the through-hole H by the drawing force.

It should be noted that the present invention is not limited to the above embodiment. The number of the stepped projections 20 may be six or ten.

The split small diameter tubular section 19 at the larger diameter side of the diameter enlargement tubular section may be omitted. However, taking into consideration of the grommet that may drops off from the through-hole after attaching the grommet to the through-hole, it is preferably that the split smaller diameter tubular section is provided at the larger diameter side and a tape is wound around the split smaller diameter tubular section together with the wire harness. The grommet may be provided with a tubular section for threading a cable for option parts. In addition, the present invention can be applied to the case where the through-hole is formed into an elliptical shape and the diameter enlargement tubular section is formed into an elliptical shape in cross section.

The invention claimed is:

1. A grommet to be installed in a through-hole in a vehicle body panel with said grommet being mounted on a wire harness for a motor vehicle, said grommet being made of rubber or elastomer, said grommet including a smaller diameter tubular section, a diameter enlargement tubular section continued to an end of said smaller diameter tubular section, and a vehicle body engagement annular recess on an outer surface of said diameter enlargement tubular section at a larger diameter side, said smaller diameter tubular section being inserted into said through-hole from one side of said vehicle body panel and being drawn from the other side of said vehicle body panel so that said vehicle body engagement annular recess is engaged with said vehicle body panel;

said diameter enlargement tubular section being provided on an outer peripheral surface with a plurality of stepped projections that are spaced apart from one another in a peripheral direction and extend from said smaller diameter tubular section to said vehicle body engagement annular recess in an axial direction;

each of said stepped projections being provided on an outer surface with an angle rib that protrudes from a connecting side end of said smaller diameter tubular section to a contact position on which said angle rib contacts with a peripheral edge around said through-hole when inserting said grommet into said through-hole, each of said angle ribs protruding from said connecting side end in a direction perpendicular to an axial direction of said grommet, each of said angle ribs being provided with a flat projection surface that protrudes in a direction perpendicular to a central axial line of said grommet, and with a slope that inclines from a crest projection end of said flat projection surface to an outer surface of said stepped projection;

each of said angle ribs being provided on a whole length of an outer surface of each stepped projection in a peripheral direction, a virtual outer diameter D1 of a line connecting said crest projection end of each of said angle ribs being set to be fifty percent to eighty percent of an inner diameter d of said through-hole, and said crest of each angle rib being disposed from an end of said smaller diameter tubular section within a range of ½ to ⅔ of a whole length from an end at a side of said smaller diameter tubular section to said contact position on which said smaller diameter tubular section contacts with said peripheral edge around said through-hole;

said slopes of said angle ribs disposed at lower positions being held on an inner peripheral surface of said through-hole with said smaller diameter tubular section being inserted in said through-hole, said grommet being held at a temporary position until said smaller diameter tubular section is drawn from the other side, and said slopes of each of said angle ribs disposed at upper positions being brought into contact with said peripheral edge around said through-hole at a position where said slopes at the upper positions do not pass over said vehicle body engagement annular recess while holding said grommet at said temporary position;

said flat projecting surface of each of said angle rib interfering with said through-hole so that said grommet is blocked from entering said through-hole, and an inserting posture being corrected to a straight direction so that said flat projecting surfaces do not interfere with said through-hole.

2. A grommet according to claim 1, wherein a groove is provided between each of said angle ribs and an outer surface of said smaller diameter tubular section.

3. A grommet according to claim 1, wherein said vehicle body engagement annular recess includes a first higher wall at a side of a distal end thick portion and a second lower wall at a side of a smaller diameter tubular section, said first and second lower walls being disposed across a groove bottom of said recess, said second lower wall is formed into a shape adapted to be deflected inward so that said second lower wall can pass said through-hole, said diameter enlargement tubular section is provided on an outer peripheral surface with more than six stepped projections so that each of said projections protrudes from said connecting end of said smaller diameter tubular section, each of said stepped projections extends to a projecting end of said second lower wall of said vehicle body engagement annular recess, widths of said stepped projections in the peripheral direction are set to be equal to one another, each of said stepped projections extends in the axial direction of said grommet, each of said stepped projections is provided with said angle rib on said contact position where said stepped projections contact with said peripheral edge around said through-hole when inserting said grommet, a projecting amount of each stepped projection is substantially constant from a connecting end to said angle rib to the distal end of said second lower wall, and said second lower wall is provided near an end with a peripheral groove.

* * * * *